United States Patent [19]

Valentine

[11] Patent Number: 4,932,846
[45] Date of Patent: Jun. 12, 1990

[54] RESILIENT SHAFT MOUNTING FOR PUMP

[75] Inventor: Wilbur Valentine, Greencastle, Pa.

[73] Assignee: Shippensburg Domestic Pump Co., Shippensburg, Pa.

[21] Appl. No.: 398,330

[22] Filed: Aug. 21, 1989

Related U.S. Application Data

[63] Continuation of Ser. No. 83,257, Aug. 6, 1987, abandoned.

[51] Int. Cl.⁵ .............................................. F04B 17/00
[52] U.S. Cl. ..................................... 417/407; 415/142
[58] Field of Search ................... 417/407, 409, 423.12, 417/423.3, 424.1; 248/603, 604; 384/125, 215; 415/142

[56] References Cited

U.S. PATENT DOCUMENTS

| | | | |
|---|---|---|---|
| 633,477 | 9/1899 | Northam | 415/142 |
| 1,746,889 | 2/1930 | Fitzer . | |
| 1,747,848 | 2/1930 | Schmidt | 415/142 |
| 2,267,459 | 12/1941 | Hait . | |
| 2,280,626 | 4/1942 | Carpenter . | |
| 3,185,532 | 12/1962 | Loch . | |
| 3,318,642 | 5/1967 | Peterson . | |
| 3,515,449 | 9/1968 | Harbage, Jr. . | |
| 3,606,505 | 9/1971 | Satterthwaite et al. . | |
| 3,929,392 | 12/1975 | Ogino . | |
| 4,033,642 | 7/1977 | Sorgatz et al. . | |
| 4,177,022 | 12/1979 | Roth | 417/423.12 |
| 4,247,156 | 1/1981 | King | 384/125 |
| 4,358,166 | 11/1982 | Antoine | 384/215 |
| 4,526,483 | 7/1985 | Hishikawa et al. . | |
| 4,549,821 | 10/1985 | Kawakami . | |
| 4,655,614 | 4/1987 | Schott | 384/215 |
| 4,666,315 | 5/1987 | Scranton . | |
| 4,669,953 | 6/1987 | Gschwender | 415/142 |
| 4,770,048 | 9/1988 | Viresky et al. | 384/215 |

Primary Examiner—Louis J. Casaregola
Assistant Examiner—Timothy S. Thorpe
Attorney, Agent, or Firm—Steele, Gould & Fried

[57] ABSTRACT

A resilient shaft mounting for a pump includes one or more sets of leaf plates bearing inwardly from an inner surface of a tube and pressing a resilient bushing on a rotatable shaft. Three plates can each be disposed by their ends to press inwardly against a bushing formed by a water lubricated rubber tube operating as an anti-frictional contact element. The plates are larger than the internal diameter of the tube, and are welded together at their ends. Upon placing the plates in the tube, the plates deform inwardly against the tube to accomplish a tight yet resilient mounting.

8 Claims, 2 Drawing Sheets

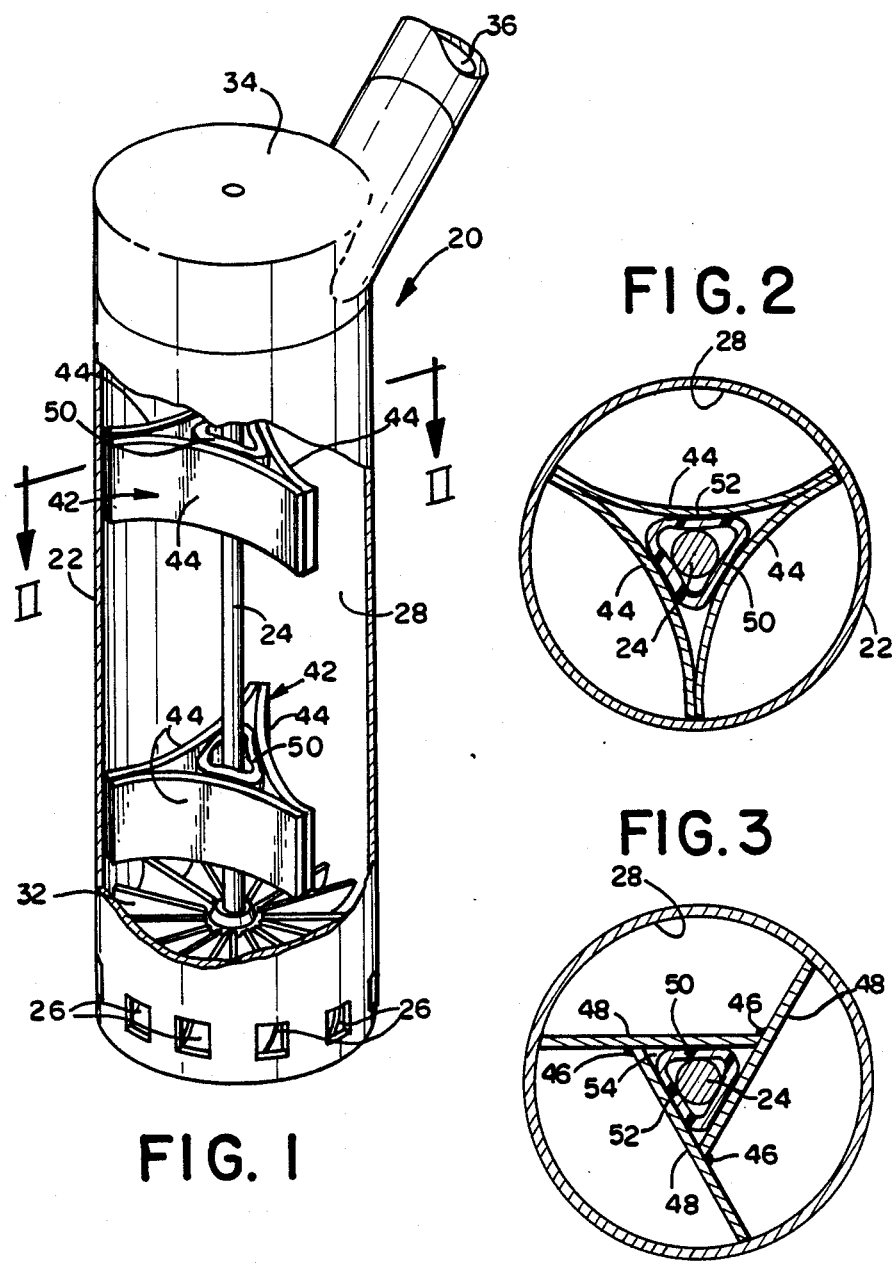

RESILIENT SHAFT MOUNTING FOR PUMP

This is a continuation, of application Ser. No. 083,257, filed Aug. 6, 1987, now abandoned.

BACKGROUND OF THE INVENTION

1. Field of the Invention

This invention relates to the field of mountings for rotating shafts, and in particular to an inexpensive self-centering mounting for a water lubricated pump shaft rotatable within a tube.

2. Prior Art

It is known to employ a rubber sleeve or similar type of resilient bushing as a friction reducing element supporting a shaft and adapted to be lubricated by water. Rubber is, of course, a resilient waterproof material. Water between the rubber bearing and the shaft lubricates the rubber bearing. This effect can be maximized by carrying water to the area of the bearing by ridges or grooves formed in the rubber bearing, bushing or the like. Such bearing and bushings are employed in propeller shaft mounts for boats, in water pumps and in other similar applications. Reference can be made, for example, to U.S. Pat. No. 3,515,449.

In connection with substantially-elongated rotatable shafts to be substantially torqued and/or operated at high RPM., it is necessary either to provide a very massive and/or large diameter shaft, or to support the shaft at a plurality of axially spaced locations along its length. It has been proposed to support a shaft within an annular supporting ring or tube using a resilient mounting in which spring-like material is disposed in a circle or configured as a spiral wrapping bearing radially inwardly on the shaft, and tending resiliently to keep the shaft in place at the center of the ring or tube. The ring or tube is then rigidly fixed in place, e.g., to the boat hull or pump housing. Examples can be found in U.S. Pat. Nos. 4,526,483 and 4,549,821. Such devices can be characterized as mounting the shaft by means of an axially symmetrical, inwardly directed spring. The difficulty with such a spring mounting is that spring force is proportional to displacement. Therefore, when the shaft is correctly centrally positioned in the mounting, the minimum amount of spring pressure is exerted on the shaft for keeping the shaft in position. Oscillations and imbalances can thereby develop and increase with resonant effects. While it may be possible to improve this characteristic by employing a strong spring pressure according to devices of this type, the fact remains that the minimum available pressure is exerted on the shaft when the shaft is centrally positioned, allowing the maximum freedom for initiation of oscillation of the shaft at precisely the area in which the shaft is intended to be maintained in place and to most frequently reside.

U.S. Pat. No. 4,177,022 discloses an attempt to hold a rubber bushing for a pump at a central position within a tube, by means of a wire holder or "spider". An inner loop encloses the rubber bushing and an outer loop bears outwardly on the pump casing, shaped as a tube. A wire web connecting the inner and outer loops is all that is provided to minimize displacement. In such a device, the resistance against displacement of the shaft is directional, i.e., is strongest along the radial line of extension of the wire between the inner and outer loops, and weakest at angles perpendicular thereto. If such a wire is disposed in a spiral, very little pressure is exerted to keep the shaft centered.

In the event a very thin driven shaft, for example between a driving motor and a propeller or the like, is insufficiently supported, imbalances in the weight of the shaft and driving force can cause the shaft to bow outwardly between the points at which the shaft is supported. The force causing such bowing is dependent upon load imbalances, torque resonance and angular velocity. For higher speed operation, supports must be spaced closely and/or the shaft must be made thick to reduce imbalances tending to bow or whip the shaft. Multiplying the number of supports and increasing the weight of the mechanical parts increase the expense of pumps and other driven machines. Therefore, there is a need to support a shaft in a manner that will facilitate use of a very light-weight shaft, with a minimum number of axially spaced supports, and a high relative force exerted holding the shaft against displacement even while in its central, properly-fixed position.

The present invention approaches the problem by producing a resilient mounting which is characterized by plate-like resilient supports opposed to produce substantial pressure on the shaft at angularly spaced points around the shaft mounting. This is accomplished preferably by means of springy stainless steel plates which are disposed within a tube, for example a liquid-carrying tube of a pump, and bowed inwardly against the shaft, whereby even in the properly-centered position, substantial pressure is exerted on the shaft by the plate-like mounting webs. These webs are relatively simple and uncomplicated, thereby decreasing expense. The webs can be elongated along the axis of the shaft, for example one or several inches in width, the shaft being thereby supported along such elongation, and the webs spreading their force and improving the extent of stabilization of the overall shaft. The mounts themselves are easily installed, and are inexpensive yet effective.

SUMMARY OF THE INVENTION

It is an object of the invention to produce a mounting for elongated rotatable shafts capable of effectively stabilizing even a thin shaft against deformation, but at a minimum of expense.

It is a further object of the invention to produce a very low cost underground-type pump having an elongated shaft in a tube, the shaft carrying a propeller or the like for lifting liquid to a centrifugal pump disposed at the top of the tube.

It is a further object of the invention to provide a resilient mounting for a rotating shaft that exerts substantial symmetrical centering pressure retaining the shaft in position.

It is a further object of the invention to provide a mounting for a shaft in a tube, especially adapted for water-lubricated applications.

These and other objects are accomplished by a resilient shaft mounting for a pump including one or more sets of leaf plates bearing inwardly from an inner surface of a tube and pressing a resilient tube against a rotatable shaft at angularly spaced locations around the shaft. Three plates can each be disposed with their ends bearing on the inside of an outer tube to press inwardly on a rubber bushing operating as a anti-frictional contact element. The plates at rest are larger than the internal diameter of the tube, and are welded together at their ends. Upon placing the plates in the tube, the plates deform inwardly against the tube to accomplish a tight yet resilient mounting.

BRIEF DESCRIPTION OF THE DRAWINGS

There are shown in the drawings the embodiments that are presently preferred. It should be understood that the invention is not limited to the precise arrangements and instrumentalities shown, and is capable of embodiment in other combinations of features in accordance with the claims.

FIG. 1 is a partially cutaway perspective view of a pump according to the invention.

FIG. 2 is a section view taken along lines II—II in FIG. 1.

FIG. 3 is a section view of an alternative embodiment corresponding to the view of FIG. 2.

DETAILED DESCRIPTION OF THE PREFERRED EMBODIMENTS

Figure 4:
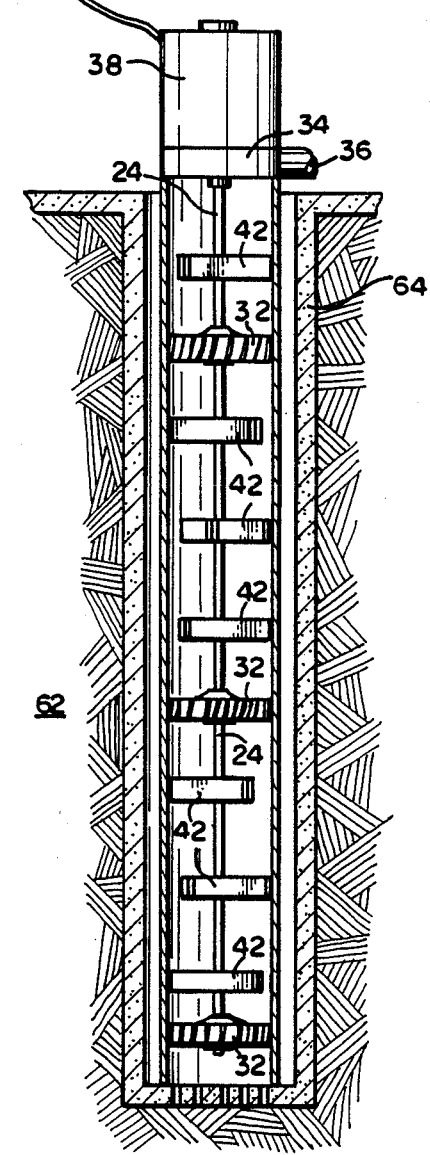
FIG. 4 is a section view of an elongated underground-type pump according to the invention, with a plurality of shaft supports.

A shaft mounting of the present type can be used for holding any shaft in place within an annular support. The use of a rubber bearing and the specific structural features of the device make it especially useful for water-lubricated environments such as pumps, boat drives and the like, wherein a shaft is disposed coaxially with a tube.

A shaft mounting according to the invention is illustrated in FIG. 1 in connection with a vertically oriented pump 20. Pump 20 is adapted for drawing water axially upwardly from the lower end of tube 22 for tangential discharge through outlet 36. Pumps of this type are used, for example, as sump pumps and the like. A centrifugal pump 34 having a housing with a lower-side inlet adjacent shaft 24 and a rotational impeller (not shown) develops a suction immediately under centrifugal pump 34, drawing water into the blades of the impeller, which blades then paddle the water out through outlet 36. Centrifugal pumps are well known in themselves and need not be described in detail.

Shaft 24 can be connected and driven together with the impeller of centrifugal pump 34. The shaft carries a propeller 32 at the lowermost end of shaft 24. Propeller 32 draws water or other fluid upwards from the bottom of the tube 22. Accordingly, centrifugal pump 34 need not be adapted to produce suction in air as necessary to prime itself by drawing the water up the tube. Pump 34 is located above the area which is expected to be occupied by water and requires no external sealing or the like, which would be required of a pump having a submersed motor. Likewise, the vertical rise of tube 22 need not be limited to the ten meters or so beyond which the weight of liquid would produce a complete vacuum at the top of the tube.

Pump 34 can be driven by an electric motor, or by other means such as a hydraulic motor, or even manually. In connection with a residential or light industrial sump pump, the pump can be driven by a simple fractional horsepower electric induction motor at about 3500 RPM. This develops a flow of water from the lower end of tube 22 upwardly to the area of pump 34, where the water is sucked into pump 34 and discharged.

As shown in FIG. 1, the lowermost end of tube 22 can be provided with inlet openings 26.

The respective dimensions of the propeller 32, tube 22 and pump 34 can be varied somewhat in order to accommodate a given distance over which the water or other fluid must be lifted, and to account for attributes of the particular fluid (e.g. water) being pumped. In connection with a domestic type water pump, a one meter lift is typical. A typical tube 22 may have a diameter, for example, of about 6 cm (2.5 inches) in such a pump.

Shaft 24 can be supported at each end, namely at the impeller of pump 34 and at the opposite end, namely below propeller 32. If a very heavy shaft 24 is employed together with a very strong mounting adjacent pump 34, then it would theoretically not be necessary to support the shaft in tube 22, either at the lowermost end or at intermediate points. However, a large diameter shaft and heavy duty mount are quite expensive. With lighter shafts, if a support is provided immediately below pump 34 and at some point spaced axially below pump 34, there is a danger that at the rotational speed of the shaft (e.g. 3500 RPM.), imbalances in the weight of the shaft, propeller or load thereon will produce an oscillation in which shaft 24 bows intermediate its bearing supports, or (assuming a bearing support spaced from the end) the distal end of shaft 24 carrying propeller 32 becomes unbalanced and begins to whip around the axis of rotation. If a relatively less rigid lighter material and/or small diameter shaft 24 is used, the problem of imbalance is aggravated and it is necessary to provide support bearings 42 at one or more points along the shaft where bowing or whipping might displace the shaft from the axis. According to the invention, the supports 42 are inexpensive in that they are self-centering and made of inexpensive easily-assembled components. These mounts 42 are relatively wide along the shaft axis and thus also have an inherent supporting effect that is not precisely limited to a very narrow area along shaft 24. Therefore, it is possible according to the invention to operate pump 34 at 3500 RPM., to use a relatively narrow shaft 24 connected to the pump impeller, for example of 0.6 cm (0.25 in.), while securely supporting shaft 24 in its centered position, coaxial with tube 22. In the illustrated embodiment of FIG. 1, two leaf plate bearing structures 42 are provided along the length of shaft 24. Each leaf plate extends 2–3 cm or move axis along the axis. It is possible to employ more supports 42, or fewer supports 42, within variations which will be apparent, including corresponding increase or decrease in shaft diameter, leaf plate width or thickness and the like.

Figure 5:
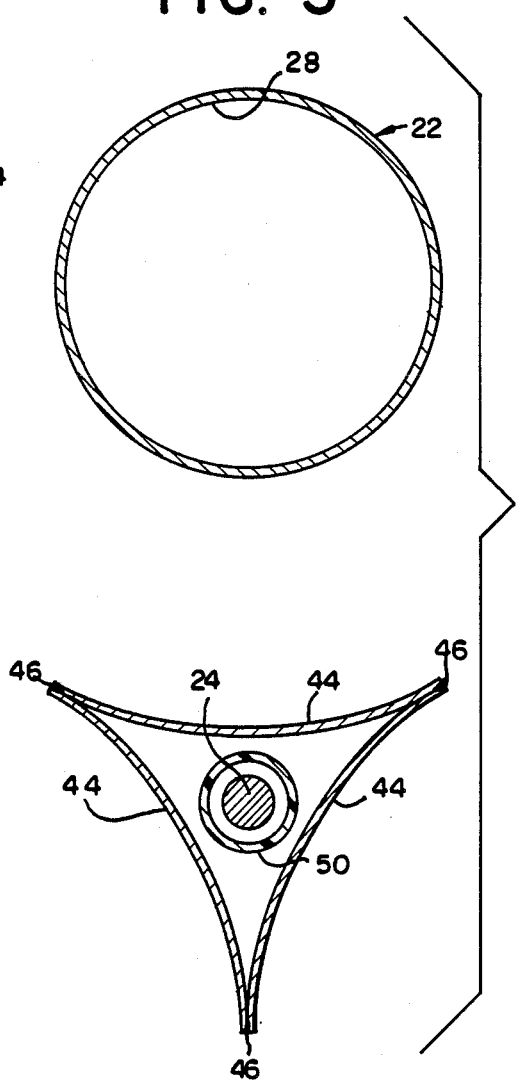
FIG. 5 is an exploded section view corresponding to FIGS. 2 and 3, with the shaft mounting plates shown removed from the tube.

Each plate bearing 42 comprises a plurality of plates which bear by at least one of their ends against the inner surface 28 of tube 22. FIGS. 2, 3 and 5 illustrate cross-sectional views through the tube 22 and bearing support 42. As shown in FIG. 2, the respective plates of bearing 42 can be oriented directly radially at their ends, as in FIG. 2, or substantially-radially as in FIG. 3. In each case, force exerted radially of the axis of shaft 24 is carried substantially in the plane of the bearing plates of support 42 rather than perpendicular thereto. In the embodiment of FIG. 2, the force exerted on the inner surface 28 of tube 22 is precisely radial. In that case, a radial force inwardly along the planes of plates 44 causes a resilient pressure on the shaft 24 and its resilient bearing tube 50. The individual plates function as structural arches. If, for example, a transverse force on shaft 24 tends to force shaft 24 toward the contact point between plates 44 and tube 22, the result is to squeeze together these plates, tending to support shaft 24 and retain in its centered position. Furthermore, even at rest, the plates 44 are bent such that they exert an inward pressure on shaft 24 through resilient bearing 50.

The bent-plate embodiment of FIG. 2 is shown disassembled in FIG. 5. Three plates 44 are preferably attached together before being installed in tube 22. The plates, which are springy flat sheets of steel or the like, can be spot welded at their ends, as shown at welds 46. By clamping the plates prior to welding, the result is the inwardly-bent configuration shown in FIG. 5, wherein plates 44 are bent mildly toward the center point leaving a large central space. FIG. 5 also illustrates shaft 24 and resilient bearing 50. Resilient bushing or bearing 50 is a simple tube, for example of silicone rubber, having an inside diameter slightly larger than tube 24.

Plates 44 as shown in their at-rest configuration of FIG. 5, define a larger outside diameter than the inside diameter of tube 22 and a larger inside diameter than rubber bearing 50. Upon insertion of the plates into tube 22, the arc of each of plates 44 becomes deeper as the entire arrangement is resiliently compressed into tube 22. This causes the plates 44 to each bear inwardly on resilient bearing 50, and on shaft 24, according to the configuration shown in FIG. 2. The configuration is characterized by points of contact between plates 44 and bearing 50, and between bearing 50 and shaft 24, symmetrically spaced around the shaft at three points. There is also a gap 54 at three other spaced points, corresponding to the apices or junctions between plates 44. These gaps 54 define water lubrication paths by which the rubber bearing 50 is lubricated in operation with respect to shaft 24. Therefore, no additional lubrication is required. This is accomplished as shown using a simple rubber tube as bearing 50 and supporting plates forming arches bearing tightly on the bearing.

The embodiment of FIG. 3 likewise employs a three plate configuration, although more plates could be employed as will in either embodiment. In this case, plates 48 are straight, but are not precisely radial. Welds 46 attach the plates together and cause each to bear inwardly on bearing 50 and shaft 24. As in the previous embodiment, contact points 52 and gaps 54 are defined around the shaft.

The bearing mount of the invention is capable of very easy assembly. The plates need only be clamped and forced into tube 22. Welding is not strictly necessary, but is preferred. The length of the plates can be varied slightly to vary the force exerted on the resilient tube. It is presently preferred in the subject example of a 0.6 cm (¼in.) diameter shaft, to use a rubber tube bearing of 0.8 cm (5/16 in.), producing contact points and gaps as shown. Three bearing sets 42 can be spaced along a shaft according to the typical sump pump embodiment with a one meter (3 feet) lift, the bearing sets being spaced about 23 cm (9 in.) axially along the shaft.

FIG. 4 illustrates a further embodiment in which an elongated shaft 24 is employed with a plurality of spaced bearing plates 42 and interspersed propellers 32. An electric motor 38 drives pump 34 and attached shaft 24. Tube 22 defines a continuous length from pump 34 to an intake at the lowermost end, but can be built up by connecting shorter segments. It is possible to provide side intake holes as are defined by intakes 26 in FIG. 1 or to allow the water or other liquid access from under tube 22. The elongated configuration of FIG. 4 can be made in complete segments rather than segmenting only tube 22, i.e., with interconnectable sections of tube 22 having short shaft sections in each subject to being coupled with adjacent shaft sections, whereby the user can construct the pump to have as many segments as needed, with motor 38 being provided at an appropriate capacity to lift the water using propellers 32 and discharge it through centrifugal pump 34 via outlet 36. The respective support plate sections 42 can each be defined by three segments of eighteen gauge stainless steel, for example 2.5 cm (1 inch) in width along the axis of the shaft. Preferably, the plates are only held in the tube 22 by friction, but the respective plates in each set are welded to one another at their tips. The angular alignment of successive supporting plate configurations 42 can be varied randomly along the shaft such that the capacity of shaft 24 to resist lateral loading is evenly distributed.

It will be appreciated that each plate 44 of support bearing configurations 42 functions to some extent as a spring and to some extent as an arch. In the embodiment of FIG. 2, force directed for example downwardly in the plane of the drawing toward the junction of the two lower plates causes these plates to be urged toward one another, constricting the shaft and holding it in position. Should a force be exerted in exactly the opposite direction, i.e., upwardly in the plane of the sheet, the upper plate resists deformation with the force running along the plate and exerted substantially radially of tube 22.

Compression along the plane of upper plate 44 in the case of an upward force is quite effective at keeping shaft 24 in its centered position. However, there is a possibility of a very severe transverse force that could catastrophically pop plate 44 into an upwardly-bowed state, releasing shaft 24. Welding together the plates makes this less likely. In order absolutely to prevent this from occurring, it is possible to supplement plates 44 with spacers on inner surface 28 of tube 22 (or on plates 44 themselves), that will prevent any of the plates 44 from popping into the oppositely-curving direction. These spacers need not extend completely from the plates to the walls, but need only extend far enough to prevent plates 44 from being snapped past the point of a straight line between their ends. Accordingly, even in the event of a severe transverse stress, for example if the pump is aligned sideways and dropped from a substantial distance, the bearing mount will simply return to centered position, surviving the stress without any permanent injury whatsoever.

The invention has been described with respect to a pump but is applicable to shafts generally, and water lubricated shafts in particular. Insofar as a pump is concerned, the centrifugal pump and propeller-type remote impeller(s) can be replaced with other elements such as an auger type remote impeller, piston or compressed tubing type pump (provided a drive is available for the shaft), and others.

The invention having been disclosed, a number of additional variations will occur to persons skilled in the art. Reference should be made to the appended claims rather than the foregoing specification as defining the true scope of the invention.

What is claimed is:
1. A pump, comprising:
  a tube having a centrifugal pump mounted on an upper end thereof, the centrifugal pump having an inlet coaxial with the tube, an outlet disposed radially and an impeller rotatable in a housing to pump a liquid;

at least one propeller disposed in the tube below the centrifugal pump, the propeller being rotatable to draw fluid upwardly in the tube;

a shaft connecting the impeller of the centrifugal with the propeller in the tube;

at least one triangular support for the shaft, having three resilient planar plates dimensioned to be bowed inwardly in the tube and enclosing the shaft, the plates being discrete sections, each having ends disposed against an inner surface of the tube and against an adjoining one of the plates, an intermediate portion of each of the plates resiliently bearing inwardly toward the shaft; and, a resilient bushing disposed between the plates and the shaft, the resilient bushing being a round tube deformed into a triangular shape by pressure of said plates;

whereby the shaft is supported coaxially in the tube.

2. The pump of claim 1, wherein the resilient bushing includes a length of resilient tubing on the shaft.

3. The pump of claim 2, wherein three of said plates bear inwardly on the tube, the plates compressing said resilient tubing of the bushing inwardly on the shaft at generally triangulated points spaced around the shaft.

4. The pump of claim 3, wherein the plates are welded together along at least one end of each plate.

5. The pump of claim 3, wherein said three plates are joined to one another at opposite ends of each of the plates.

6. The pump of claim 5, wherein the plates are welded together at opposite ends, the plates at rest having ends disposed to define a diameter greater than an internal diameter of the tube, the plates being compressible inwardly on the bearing for insertion in the tube.

7. The pump of claim 6, comprising a plurality of sets of three of said plates, spaced axially along the shaft.

8. The pump of claim 7, comprising a plurality of propellers interspersed among said sets of plates.

* * * * *